United States Patent
Reitz

(10) Patent No.: US 6,646,226 B1
(45) Date of Patent: Nov. 11, 2003

(54) HEATED COMPUTER KEYBOARD

(75) Inventor: Larry E Reitz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/284,697

(22) Filed: Oct. 29, 2002

(51) Int. Cl.[7] ............................................... H05B 3/00
(52) U.S. Cl. ...................... 219/209; 219/210; 219/522; 219/549; 219/528
(58) Field of Search .................. 219/209, 210, 219/520, 522, 552, 553, 201, 549, 528, 217, 218; 392/425, 432, 435; 341/22; 607/108, 111; 248/118, 118.1; 400/715

(56) References Cited

U.S. PATENT DOCUMENTS

| | | | |
|---|---|---|---|
| 5,193,523 A | | 3/1993 | Denber |
| 5,375,165 A | | 12/1994 | Haber et al. |
| 5,513,070 A | | 4/1996 | Xie et al. |
| 5,576,706 A | | 11/1996 | Daigle et al. |
| 5,674,423 A | * | 10/1997 | Wright, Sr. ............... 219/549 |
| 5,686,005 A | | 11/1997 | Wright, Sr. |
| 5,739,776 A | * | 4/1998 | Chen ............................ 341/22 |
| 5,758,019 A | * | 5/1998 | Klopotek ...................... 392/432 |
| 5,828,034 A | | 10/1998 | Chang |
| 5,940,485 A | | 8/1999 | Sapra et al. |
| 5,982,357 A | * | 11/1999 | Burgett et al. ................ 341/22 |
| 5,986,586 A | * | 11/1999 | Tsai ............................ 341/22 |
| 6,115,540 A | | 9/2000 | Klopotek |
| 6,215,420 B1 | * | 4/2001 | Harrison et al. .............. 341/22 |
| 6,215,657 B1 | | 4/2001 | Bhatia |
| 6,239,390 B1 | | 5/2001 | Fukui et al. |
| 6,312,175 B1 | | 11/2001 | Lum |
| 6,322,229 B1 | | 11/2001 | Chan et al. |
| 6,373,471 B1 | * | 4/2002 | Lin ............................. 341/22 |
| 6,439,785 B1 | * | 8/2002 | Liu ............................. 341/22 |

* cited by examiner

*Primary Examiner*—Teresa Walberg
*Assistant Examiner*—Fadi H. Dahbour

(57) ABSTRACT

A keyboard includes a plurality of keys mechanically and electrically coupled to a printed circuit board, the plurality of keys are arranged in a keyboard defining air gaps around the plurality of keys. The keyboard also includes a keyboard housing for containing the printed circuit board, the keyboard housing further including an opening on at least a portion of a top surface thereof for usably exposing the plurality of keys therethrough. The keyboard also includes a heating element located within the keyboard housing, the heating element and the printed circuit board deriving power from a keyboard port of a computer when the keyboard is coupled to the computer.

22 Claims, 5 Drawing Sheets

HEATED COMPUTER KEYBOARD

BACKGROUND OF THE INVENTION

Typical computer users generally access and interact with the computer for an appreciable amount of time during a particular session. Furthermore, interaction with a computer device via a keyboard generally requires repetitive motions and sustained articulation, and, oftentimes, at a significant sustained rate of movement. Because of the continued exposed nature of such extremities, it is common for a user's fingers and hands to become uncomfortably cold and stiff. Such stiffness and discomfort may become so overwhelming as to impair or otherwise affect a user's efficiency.

Furthermore, the types of materials generally utilized in a computer keyboard composition lends itself to mirror the ambient environment as opposed to absorbing and retaining heat from interaction with the user's fingers. In addition to the discomfort associated with the ambient temperature-assimilating keyboards of the prior art, there are many clinically recognized maladies which may be exacerbated by exposure to cold devices and interfaces. One well-known illness, carpal tunnel syndrome, is an illness which can affect computer users. The pain associated with such a syndrome is further aggravated, not only by the repetitive motion, but also by the cooler temperatures.

Accordingly, there is a need to provide a therapeutic relief solution to computer users as well as others who engage in repetitive manual operations, such as the operation of a keyboard. Accordingly, it would be desirable to provide a warmed environment for a user's hands without interfering with the manual interaction between a user and a keyboard.

BRIEF SUMMARY OF THE INVENTION

A computer input peripheral, such as a keyboard, that provides a physical interface for touching by a user is described herein. The keyboard provides a heated interface for touching by the user.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
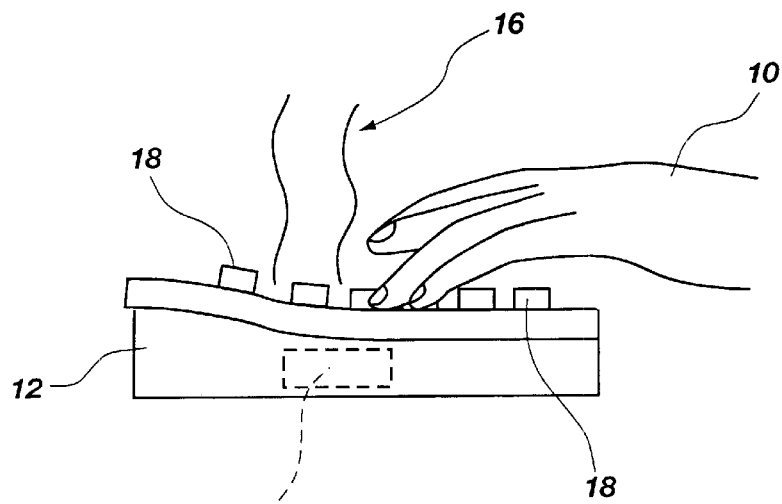
FIG. 1 is a side view of a keyboard as utilized by a user, in accordance with the heated aspect of the present invention.

FIG. 1 illustrates one application of the present invention as applied to improving the ergonomics and usability of a ubiquitous device, namely a computer keyboard. In FIG. 1, a user 10 is illustrated as interfacing with a computer input device, namely a keyboard. The keyboard of FIG. 1, illustrated as keyboard 12, incorporates an internal heating element illustrated in the cutaway as heating element 14. As illustrated, when activated, heating element 14 causes heat to radiate, illustrated as radiating heat 16, through or about at least a portion of keys 18 of keyboard 12.

Figure 2:
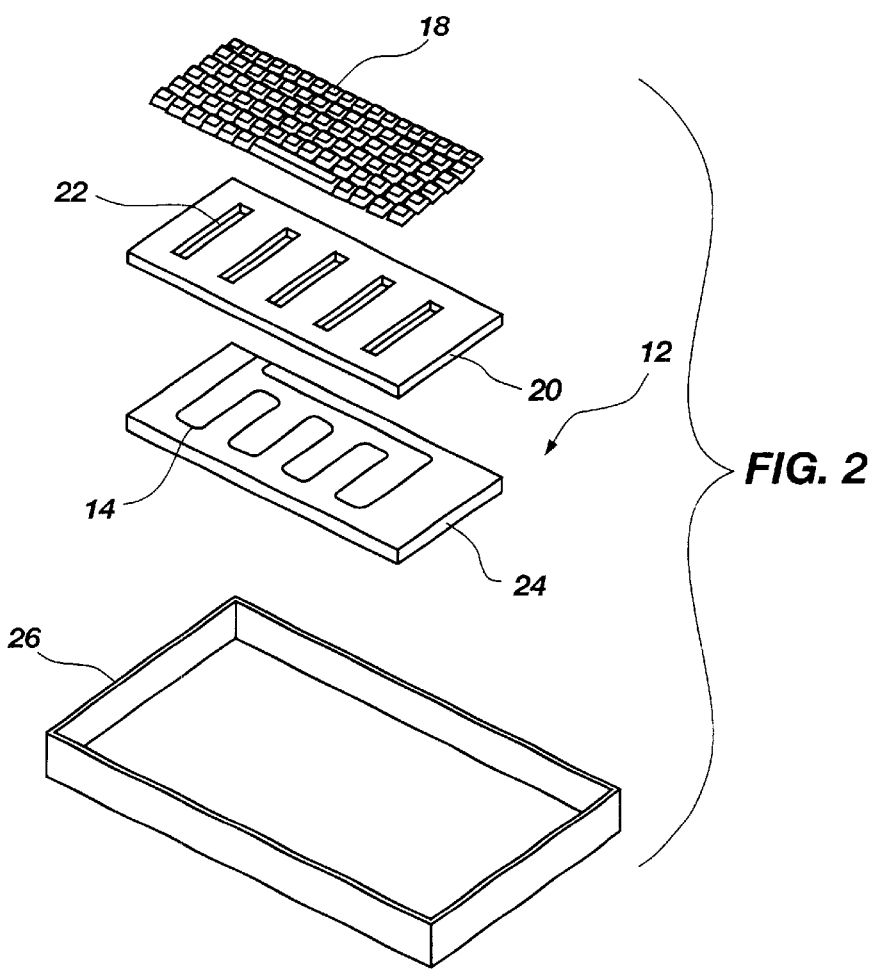
FIG. 2 is an exploded perspective view showing the heated keyboard, in accordance with an embodiment of the present invention.

FIG. 2 is an exploded view of a keyboard 12 which may take various forms other than the one illustrated in FIG. 2; however, such additional embodiments are contemplated within the scope of the present invention. FIG. 2 illustrates keyboard 12 being comprised of a plurality of keys 18 which are coupled in an operatively understood manner to a printed circuit board 20 which, when cooperatively and operatively coupled with keys 18, performs a typical keyboard function, namely the detection of the articulation of one or more keys 18 and the decoding of the identity of a specific articulated key performed by circuitry resident on or about printed circuit board 20, which is generally performed by circuitry such as a keyboard controller (not shown) as well as other mechanical componentry for maintaining the tactile nature and electrical fidelity of a typical keyboard device. Heated keyboard 12 further includes a heating element 14 which is illustrated in the present embodiment as being located below both the printed circuit board 20 and the keys 18 so as to maintain the generally operative orientation for accommodating the generally upwardly radiating direction of the heat generated by heating element 14.

In order to facilitate a more evenly and desirable distribution of heat as radiated by heating element 14, heating element 14 is depicted as assuming a repeatedly traversing configuration across a significant portion of a plane parallel to the general plane of keys 18. In order to further enhance the propagation of heat from radiating element 14 in a more uniform fashion through keys 18, printed circuit board 20 may further include apertures or vents, illustrated in FIG. 2 as apertures 22. While apertures 22 are illustrated, it should be pointed out that such venting is optional as heat can transfer through and around printed circuit board 20 and still radiate through keys 18.

While heating element 14 may maintain a stand-alone arrangement as a rigid heating element, FIG. 2 illustrates an alternative configuration wherein heating element 14 is backed or otherwise supported by a heating element substrate 24. It should be appreciated that such a substrate may further facilitate manufacturability and provide a wider range of heating element compositions that find application in the present invention. Keyboard 12 is further illustrated as including a housing 26 for both practically enclosing the other elements of keyboard 12 as well as providing ducting and directionality for heat propagating from heating element 14. Various configurations of housing 26 are contemplated including clam-shell arrangements as well as other multi-faceted and multipiece embodiments.

Figure 3:
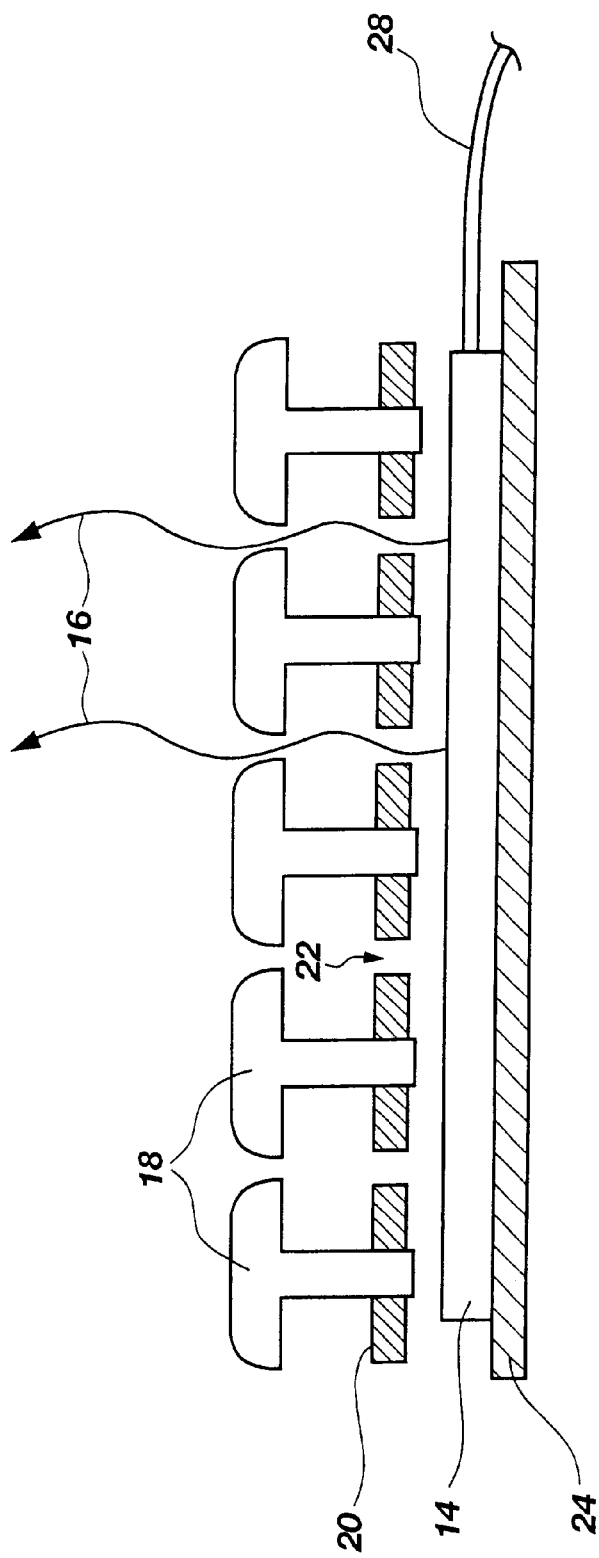
FIG. 3 is a cross-sectional view of a heated keyboard, in accordance with an embodiment of the present invention.

FIG. 3 illustrates a cross-sectional view of a portion of the heated keyboard, in accordance with an embodiment of the present invention. FIG. 3 details the relationship of keys 18 with respect to printed circuit board 20. Such an arrangement and configuration is appreciated by those of skill in the art and details associated with the mechanical resiliency as well as the electrical continuity associated with the articulation of keys 18 has not been illustrated so as to focus the illustrations on the aspects of the present invention. FIG. 3 further details heating element 14, illustrated as being backed or supported by a substrate 24, being activated and receiving electrical energy from a power source 28. Once activated, heating element 14 radiates heat, illustrated as heat 16.

As introduced above, one embodiment of the present invention contemplates channeling or otherwise facilitating the transfer of heat from the heating element through keys 18 by way of vents or apertures, one of which is illustrated in FIG. 3 as aperture 22. It should be appreciated that while FIG. 3 illustrates apertures or vents between each key 18, selective venting so as to further maintain the integrity of printed circuit board 20 is also contemplated to be within the scope of the present invention. It should be further appreciated that the utilization of apertures or vents is optional and is not essential to the practice of the invention.

FIG. 3 further illustrates a heating element 14 that maintains a somewhat continuous parallel arrangement with keys 18, thereby accommodating a more vertical radiation of heat 16. It should be appreciated that the various radiating patterns are a function of the arrangement and topology of the heating element as well as the ducting of the housing. Therefore, various configurations, designs, implementations and topographies of heating elements are contemplated within the scope of the present invention. Furthermore, while the heating elements as illustrated herein are depicted as a single continuous heating element having an electrically series-oriented configuration with respect to power source 28, electrically parallel configurations are also contemplated within the scope of the present invention. For example, heating element 14 may be implemented as a series of electrically parallel coupled heating elements and may further be oriented in alternative configurations with respect to keys 18. One example of an alternate implementation would include a plurality of heating elements that may be individually located in proximity to the apertures of printed circuit board 20 or may alternatively be located on the side opposite of that illustrated in FIG. 3 of the printed circuit board. In such an arrangement, the printed circuit board would not necessarily utilize apertures as the heating element could radiate directly between keys 18.

Figure 4:
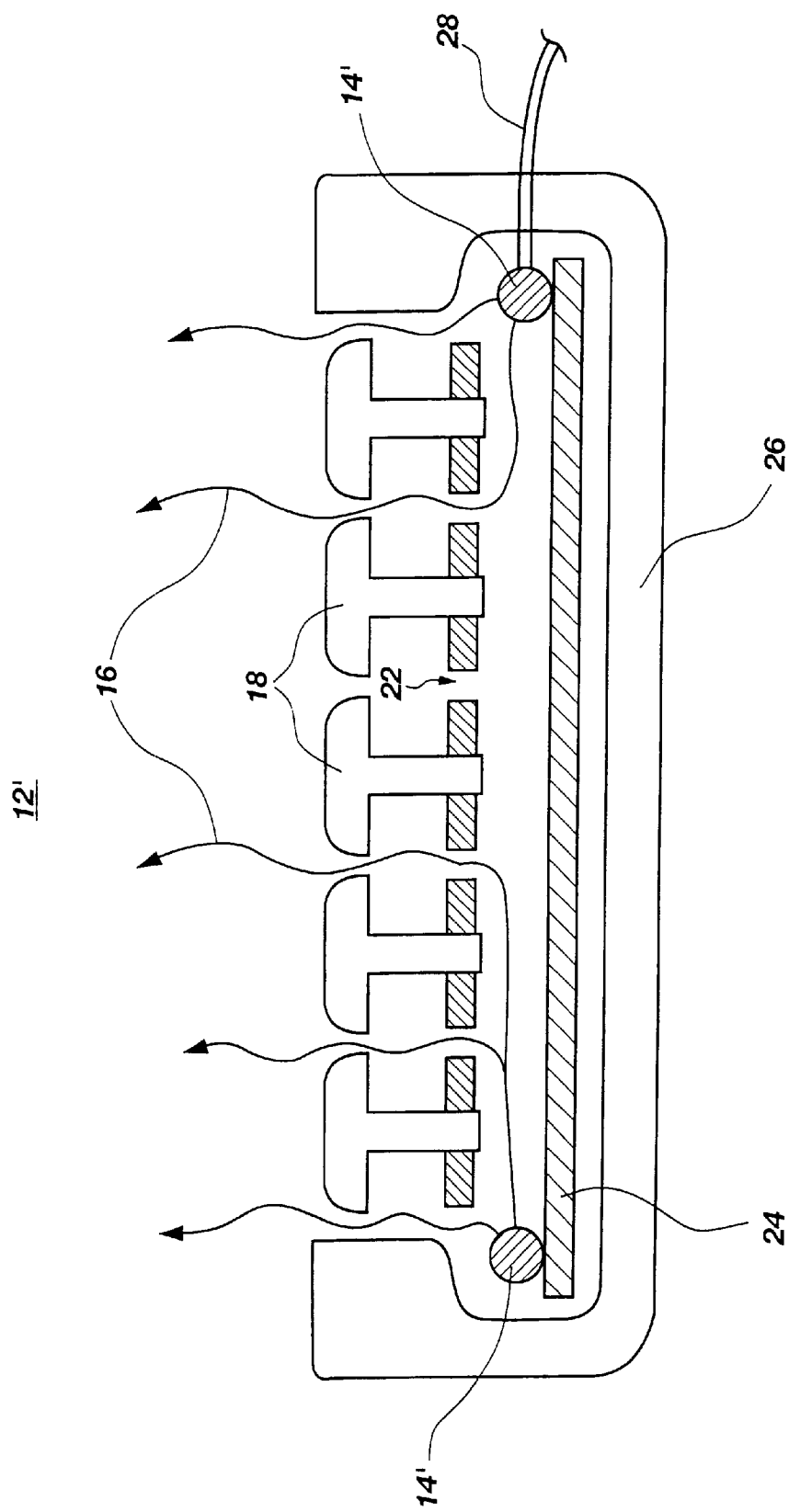
FIG. 4 is a cross-sectional view of a heated keyboard, in accordance with another embodiment of the present invention.

FIG. 4 illustrates a cross-sectional view of a heated keyboard, in accordance with another embodiment of the present invention. In FIG. 4, the heating element 14 assumes a peripheral arrangement about at least a portion of keys 18. In such a peripherally heated configuration, the ducting or routing of heat becomes of more interest so as to provide a more uniform distribution of the heat throughout keys 18. In FIG. 3, the radiation or transfer of heat assumes a horizontal component in the radiating pattern and is illustrated as being further maintained and controlled by housing 26. It should be appreciated that such a less uniform arrangement of the heating element may result in "hot spots" and "cold spots" throughout keyboard 12'.

Figure 5:
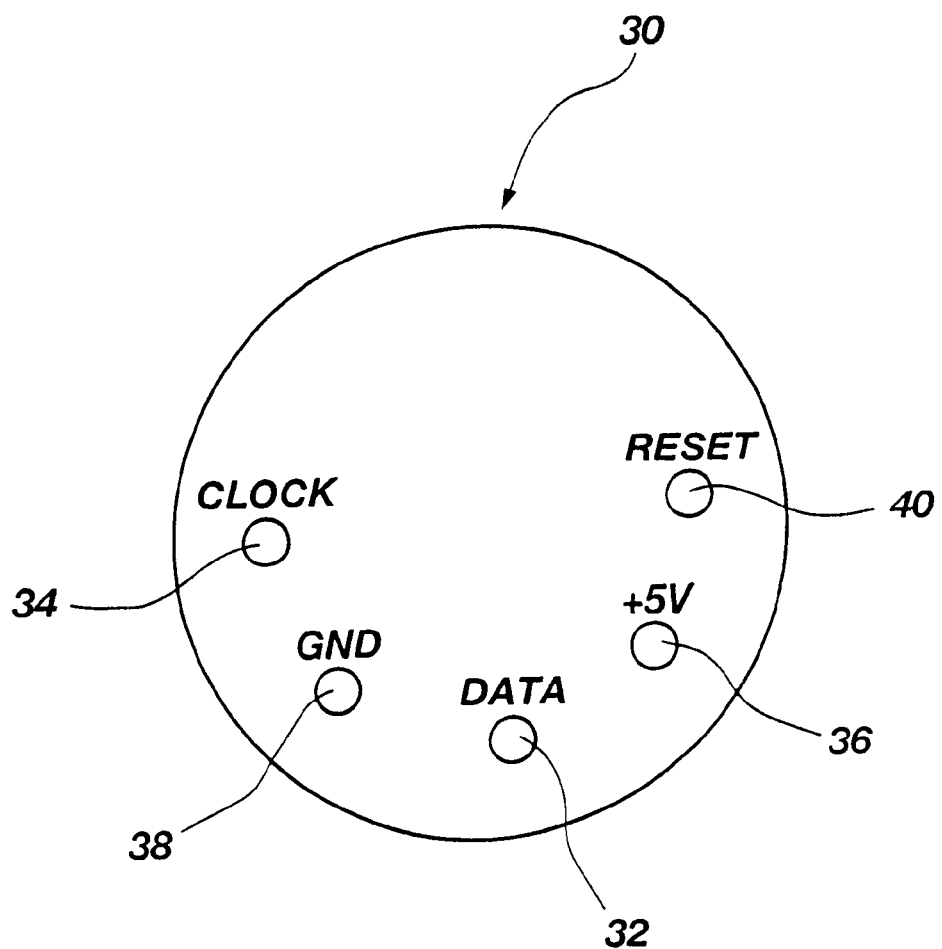
FIG. 5 is a pictorial end view of a standard computer keyboard connector showing its pinout configuration and signal assignments, in accordance with the present invention.

FIG. 5 shows a pinout configuration and signal assignment of a standard computer keyboard connector 30, also known as a keyboard port by those of skill in the art. It is appreciated that a keyboard 12 generally communicates with a computer via a serial ASCII data signal impressed on a half-duplex, bidirectional data line or data signal 32. The data signal is synchronously transferred from its source to its destination by a clock signal impressed on a clock line or clock signal 34. The clock signal is generated by keyboard 12 and, more specifically, by a keyboard controller for data transfers between keyboard 12 and a computer. Keyboard port 30 further includes a power signal 36 and a respective ground signal 38 which provides power to a peripheral device, such as keyboard 12. In the case of a typical computer environment, such as an IBM-compatible computer, power signal 36, with reference to ground signal 38, exhibits a +5 volt potential for use by keyboard 12. Power signal 36 is utilized by the present invention for the powering of heating element 14 via a connection illustrated as power source 28 in FIGS. 3 and 4. For completeness, the typical computer keyboard port 30 further includes a reset signal 40 for interaction between a keyboard and a host computer.

Figure 6:
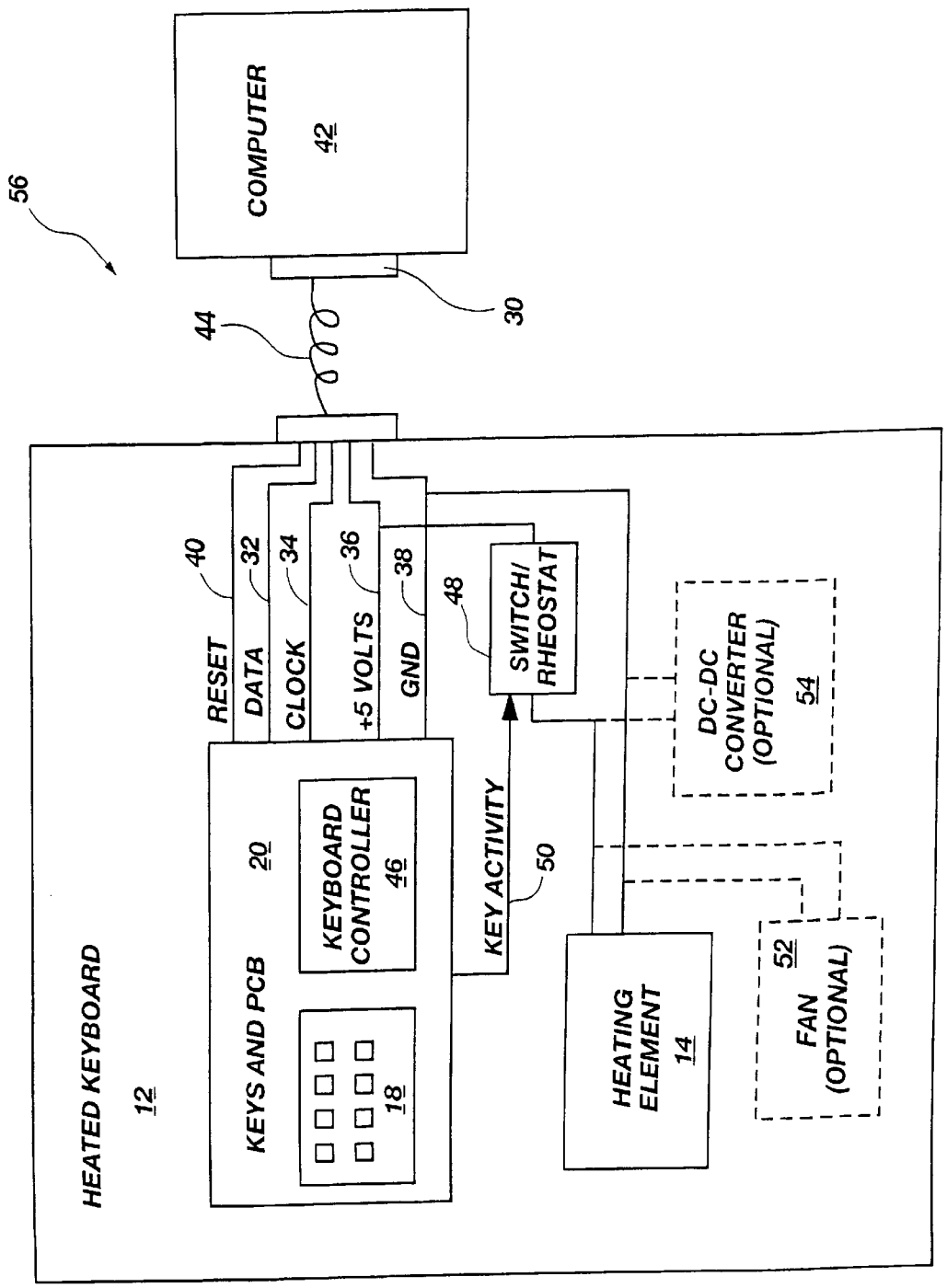
FIG. 6 is an interconnection diagram of the heated keyboard, in accordance with an embodiment of the present invention.

FIG. 6 is an interconnection diagram illustrating the electrical coupling of keyboard 12 with a computer 42, forming a computer system, in accordance with an embodiment of the present invention. Keyboard 12 and computer 42 electrically and physically couple via keyboard port 30 and an attachment cable such as a keyboard cord 44 to form a computer system 56. Keyboard cord 44 provides the electrical signals described previously with reference to FIG. 5 for use by keyboard 12 in the performance of keyboarding functionality as well as for providing the power necessary for the activation of the heating aspects of the embodiment of FIG. 6. In FIG. 6, keyboard 12 includes the keyboarding functionality as appreciated by those of skill in the art implemented through the use of keys 18 and printed circuit board 20 having a keyboard controller 46 thereon for the performance of detection, identification, and encoding of the respective key articulation.

The heating aspects of keyboard 12 are implemented by coupling heating element 14 with the power source, as exhibited by the voltage potential between power signal 36 and ground signal 38 as received from the keyboard port 30 of computer 42. The intensity of the heat provided by heating element 14 may be controlled through the selection of specific heating elements with respective resistances compatible with the arrangement and configuration of the heating element within the keyboard housing, as well as the relationship of the heating elements to the printed circuit board 20 and keys 18.

In one embodiment of the present invention, the activation of heating element 14 may be performed by a user through the activation of a switch 48, which in one embodiment is operative as an on and off switch. The present invention also contemplates other switching applications such as the integration of a rheostat as a part of switch 48 for the selection of various degrees of activation for heating element 14. The switch and rheostat combination 48 may be further implemented in a stepwise manner (i.e., having high, medium, and low settings), or may be implemented as a continuous control switch for further gradations of heat intensity.

FIG. 6 further contemplates an additional switching mode wherein a control signal 50 is activated upon the detection of keyboard activity and is deactivated upon keyboard inactivity, thereby causing the deactivation of switch 48 upon the lack of key articulation of keyboard 12. In such a configuration, keyboard 12 only becomes heated upon the utilization of the keyboard and remains deactivated or becomes deactivated when the keyboard is not in use, thereby conserving power resources and minimizing the degradation of components within keyboard 12 associated with extended heat exposure. A timer feature allowing the heating element to remain active for a fixed duration with each subsequent key activity resetting the timer is also contemplated.

FIG. 6 further contemplates the integration of a fan 52 for enhancing a more uniform thermal profile throughout keyboard 12. Additional embodiments of the keyboard further include the integration of a power regulation device, illustrated as a DC—DC converter 54 capable of generating various voltage levels for utilization by heating element 14. It is appreciated by those of skill in the art that heating element efficiency is affected by electrical parameters such as the availability of voltage potentials and current. Therefore, the integration of a DC to DC converter or, alternatively, a DC to AC converter, allows for the adjustment of the voltage and current as presented to heating element 14.

It is appreciated that, although specific embodiments of the present invention have been described above for purposes of illustration, various modifications may be made without deviating from the spirit and scope of the invention. While one example of a heated keyboard implementation has been presented, modifications and functional substitutions for the keyboard and the various systems, circuits, devices and computer systems described herein are also contemplated. Accordingly, the invention is not limited by the disclosed embodiments, but, instead, the scope of the invention is determined by the following claims.

What is claimed is:

1. A keyboard, comprising:
    a plurality of keys mechanically and electrically coupled to a printed circuit board, said plurality of keys arranged in a keyboard defining air gaps around said plurality of keys;
    a keyboard housing for containing said printed circuit board, said keyboard housing further including an opening on at least a portion of a top surface thereof for usably exposing said plurality of keys therethrough; and
    a heating element located within said keyboard housing, said heating element and said printed circuit board deriving power from a keyboard port of a computer when said keyboard is coupled thereto.

2. The keyboard, as recited in claim 1, wherein at least a portion of said heating element is located radiantly under at least a portion of said plurality of keys, allowing heat from said heating element to radiate up through at least a portion of said air gaps.

3. The keyboard, as recited in claim 2, wherein said at least a portion of said heating element is located under said printed circuit board.

4. The keyboard, as recited in claim 3, wherein said printed circuit board further includes a region having at least one aperture defined therein for facilitating radiation of heat from said heating element up through said at least a portion of said air gaps.

5. The keyboard, as recited in claim 2, wherein said heating element comprises a plurality of heating elements distributed under said at least a portion of said plurality of keys.

6. The keyboard, as recited in claim 1, wherein said heating element is located about a perimeter of said plurality of keys and within said keyboard housing.

7. The keyboard, as recited in claim 1, further comprising a manual switch electrically coupled between said heating element and said power from said keyboard port, said switch for alternating between activation and deactivation of said heating element.

8. The keyboard, as recited in claim 1, further comprising a rheostat electrically coupled between said heating element and said power from said keyboard port, said rheostat for regulating an amount of heat emanating from said heating element.

9. The keyboard, as recited in claim 1, further comprising a timer switch electrically coupled between said heating element and said power from said keyboard port, said timer switch becoming activated in response to user activity with at least one of said plurality of keys.

10. The keyboard, as recited in claim 1, further comprising a fan located within said keyboard housing and electrically coupled to said power from said keyboard port.

11. A computer system, comprising:
    a computer including a keyboard port comprising at least a pair of signal lines about which power is generated; and
    a keyboard coupled to said computer via said keyboard port, said keyboard including:
        a plurality of keys mechanically and electrically coupled to a printed circuit board, said plurality of keys arranged in a keyboard grid defining air gaps around each of said plurality of keys;
        a keyboard housing for containing said printed circuit board, said keyboard housing further including an opening on at least a portion of a top surface thereof for usably exposing said plurality of keys therethrough; and
        a heating element located within said keyboard housing, said heating element and said printed circuit board deriving power from said keyboard port of said computer when said keyboard is coupled thereto.

12. The computer system, as recited in claim 11, wherein at least a portion of said heating element is located radiantly under at least a portion of said plurality of keys, thereby allowing heat from said heating element to radiate up through at least a portion of said air gaps.

13. The computer system, as recited in claim 12, wherein said at least a portion of said heating element is located under said printed circuit board.

14. The computer system, as recited in claim 11, wherein said heating element is located about a perimeter of said plurality of keys and within said keyboard housing.

15. The computer system, as recited in claim 11, further comprising a manual switch electrically coupled between said heating element and said power from said keyboard port, said switch for alternating between activation and deactivation of said heating element.

16. The computer system, as recited in claim 11, further comprising a fan located within said keyboard housing and electrically coupled to said power from said keyboard port.

17. A method of heating a computer user's hands while operating a computer, comprising:
    coupling a plurality of keys to a printed circuit board in a manner defining air gaps around said plurality of keys;
    forming a keyboard housing around said printed circuit board with an open portion of a surface of said keyboard housing for exposing said plurality of keys therethrough; and
    integrating a heating element into said keyboard housing, said heating element capable of deriving power from said computer via a keyboard port.

18. The method, as recited in claim 17, wherein said integrating a heating element further comprises locating at least a portion of said heating element under at least a portion of said plurality of keys.

19. The method, as recited in claim 18, wherein said integrating a heating element further comprises locating at least a portion of said heating element under said printed circuit board.

20. The method, as recited in claim 19, further comprising forming at least one aperture in said printed circuit board for facilitating radiation of heat from said heating element up through at least a portion of said air gaps around said plurality of keys.

21. The method, as recited in claim 17, wherein said integrating a heating element further comprises locating said heating element about a perimeter of said plurality of keys and within said keyboard housing.

22. The method, as recited in claim 17, further comprising switching said heating element for operation in an on and off state.

* * * * *